United States Patent
DeCusatis et al.

(10) Patent No.: US 9,509,555 B2
(45) Date of Patent: *Nov. 29, 2016

(54) MULTIPATH FIBER CHANNEL OVER ETHERNET NETWORKS

(71) Applicant: International Business Machines Corporation, Armonk, NY (US)

(72) Inventors: Casimer M. DeCusatis, Poughkeepsie, NY (US); Anuradha Rao, Hopewell Junction, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 156 days.

This patent is subject to a terminal disclaimer.

(21) Appl. No.: 14/501,391

(22) Filed: Sep. 30, 2014

(65) Prior Publication Data

US 2015/0172122 A1    Jun. 18, 2015

Related U.S. Application Data

(63) Continuation of application No. 14/105,983, filed on Dec. 13, 2013, now Pat. No. 9,294,341.

(51) Int. Cl.
*H04L 12/24* (2006.01)
*H04L 12/46* (2006.01)
(Continued)

(52) U.S. Cl.
CPC ......... *H04L 41/0659* (2013.01); *H04L 12/413* (2013.01); *H04L 12/4641* (2013.01); *H04L 12/4675* (2013.01); *H04L 41/0668* (2013.01); *H04L 41/0816* (2013.01); *H04L 45/24* (2013.01); *H04L 45/28* (2013.01);
(Continued)

(58) Field of Classification Search
CPC    H04L 45/00; H04L 12/4641; H04L 12/4645
See application file for complete search history.

(56) References Cited

U.S. PATENT DOCUMENTS 8,953,606 B1 * 2/2015 McGlaughlin ................ 370/229
2006/0251067 A1    11/2006 DeSanti et al.
(Continued)

OTHER PUBLICATIONS

"Converged Networks with Fibre Channel over Ethernet and Data Center Bridiging", Technology Brief, 3rd Edition, Hewlett Packard, Oct. 2011, 9 Pages.
Lemasa, Gary et al, "Fibre Channel over Ethernet in the Data Center: an Introduction", Fibre Channel Industry Association, 2007, located at www.fibrechannel.org, 8 pages.

*Primary Examiner* — Chandrahas Patel
(74) *Attorney, Agent, or Firm* — Cantor Colburn LLP; Steven Chiu

(57) ABSTRACT

Embodiments include a method and computer program product for implementing multipath selection of ethernet links in a fiber channel over ethernet (FCoE) network. A first VLAN link defines a first path through the ethernet side of the network. A link failure in the first VLAN link is replaced by activating an alternate VLAN link corresponding to an alternate path through the ethernet side of the network while disabling all other VLANS corresponding to other paths through the ethernet side of the network. An advertisement is received from the origination SAN device on the fiber channel side of the network indicating a request for network access by the origination SAN device. Communications are enabled between the origination SAN device and the destination LAN device via the alternate VLAN link. Communications are then resumed between the origination SAN device and the destination LAN device utilizing the alternate VLAN link.

14 Claims, 5 Drawing Sheets

| | | | | |
|---|---|---|---|---|
| (51) | Int. Cl. | | (56) | References Cited |
| | *H04L 12/707* | (2013.01) | | |
| | *H04L 29/08* | (2006.01) | | U.S. PATENT DOCUMENTS |
| | *H04L 12/703* | (2013.01) | | |
| | *H04L 12/753* | (2013.01) | | |
| | *H04L 12/413* | (2006.01) | | |
| | *H04L 12/931* | (2013.01) | | |

(51) Int. Cl.
- *H04L 12/707* (2013.01)
- *H04L 29/08* (2006.01)
- *H04L 12/703* (2013.01)
- *H04L 12/753* (2013.01)
- *H04L 12/413* (2006.01)
- *H04L 12/931* (2013.01)

(52) U.S. Cl.
CPC .......... *H04L 45/48* (2013.01); *H04L 67/1097* (2013.01); *H04L 49/357* (2013.01)

(56) References Cited

U.S. PATENT DOCUMENTS

| | | |
|---|---|---|
| 2010/0118880 A1 | 5/2010 | Kunz et al. |
| 2010/0214950 A1 | 8/2010 | Vobbilisetty et al. |
| 2010/0246388 A1 | 9/2010 | Gupta et al. |
| 2011/0267947 A1 | 11/2011 | Dhar et al. |
| 2012/0177045 A1 | 7/2012 | Berman |
| 2013/0028135 A1 | 1/2013 | Berman et al. |

\* cited by examiner

MULTIPATH FIBER CHANNEL OVER ETHERNET NETWORKS

DOMESTIC PRIORITY

This application is a continuation of and claims priority from U.S. patent application Ser. No. 14/105,983, filed on Dec. 13, 2013, entitled "MULTIPATH FIBER CHANNEL OVER ETHERNET NETWORKS", the entire contents of which are incorporated herein by reference.

BACKGROUND

The present invention relates generally to computer network communication systems and, more specifically, to providing multipath fiber channel over ethernet networks.

Fiber channel over ethernet (FCoE) is a standard developed for creating converged networks combining fiber channel communications conventionally used for storage area networks (SANs) with ethernet communications conventionally used for local area network (LANs). The FCoE protocol encapsulates fiber channel (FC) frames within ethernet frames to integrate the FC frames into the ethernet data stream while preserving the conventional format of the FC frames independent of the ethernet forwarding scheme. This allows an evolutionary approach towards input/output (I/O) consolidation that preserves all fiber channel constructs when FC frames are transmitted over ethernet networks. The existing latency, security, and traffic management attributes of the conventional FC infrastructure are therefore maintained to preserve existing investments in fiber channel tools, training, and SANs.

FCoE recognizes FC as the dominant storage protocol in the data center while ethernet remains the dominant LAN protocol. FCoE gives customers a viable solution for integrating FC standard SANs with ethernet standard LANs without having to abandon or modify either standard. FCoE enables the consolidation of both SANs and ethernet traffic onto a common converged network adapter (CNA), reducing the ever growing number of adapters required. FCoE therefore simplifies customer I/O environments by converging fiber and ethernet networks while avoiding the need for another, separate protocol for I/O consolidation.

SUMMARY

Embodiments include a method and computer product for implementing multipath selection of ethernet links in a fiber channel over ethernet (FCoE) network. The FCoE network includes an FCoE switch that interconnects a fiber channel side of the network with an ethernet side of the network to create a converged network. The converged network path include a communication path having a virtual storage area network (VSAN) link between an origination storage area network (SAN) device on the fiber channel side and the FCoE switch, a first virtual local area network (VLAN) link between a destination local area network (LAN) device on the ethernet side and the FCoE switch, and an alternate VLAN link between the destination LAN device and the FCoE switch. Communications are conducted between the origination SAN device and the destination LAN device by encapsulating fiber channel data frames received on the VSAN link into ethernet frames transmitted on the first VLAN link and vice versa.

A failure is detected involving the first VLAN link between the FCoE switch and the destination LAN device. The failed first VLAN link is replaced by activating the alternate VLAN link corresponding to a new path through the ethernet side of the network between the FCoE switch the destination LAN device while disabling all other VLANS corresponding to other paths through the ethernet side of the network between the FCoE switch and the destination LAN device. An advertisement is received from the origination SAN device on the fiber channel side of the network indicating a request for network access by the origination SAN device. Communications are enabled between the origination SAN device and the destination LAN device via the alternate VLAN link. And communications are resumed between the origination SAN device and the destination LAN device by encapsulating FC frames received on the VSLAN link into ethernet frames transmitted on the alternate VLAN link and vice versa.

BRIEF DESCRIPTION OF THE SEVERAL VIEWS OF THE DRAWINGS

The subject matter which is regarded as embodiments is particularly pointed out and distinctly claimed in the claims at the conclusion of the specification. The forgoing and other features, and advantages of the embodiments are apparent from the following detailed description taken in conjunction with the accompanying drawings in which:

DETAILED DESCRIPTION

Figure 1:
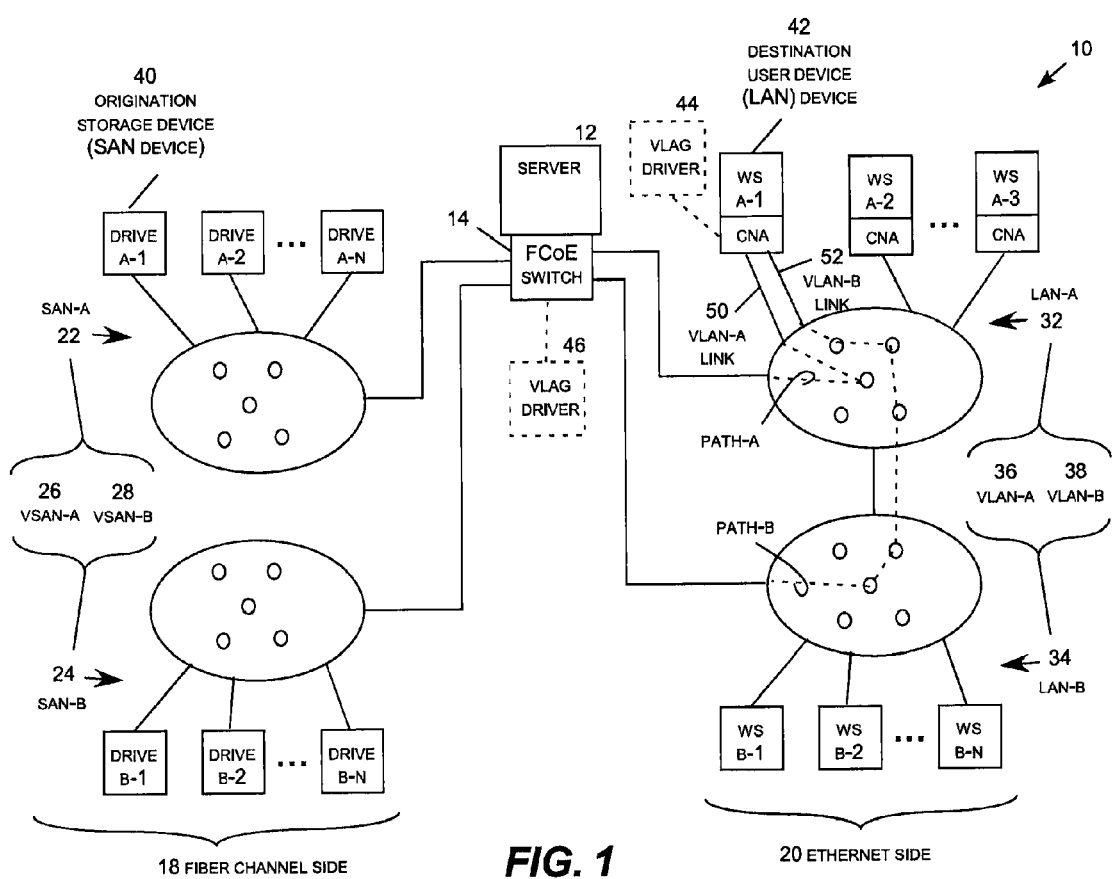
FIG. 1 depicts an FCoE switch integrating a fiber channel storage network with a ethernet local area network in accordance with an embodiment.

Embodiments of the invention may be realized in a multipath fiber channel over ethernet (FCoE) network that uses virtual local area networks (VLANs) and fiber channel forwarder (FCF) advertisements to implement multipath redundancy on the ethernet side of the network. Multiple available paths through one or more ethernet local area networks (LANs) connected to the FCoE switch are configured as virtual local area networks (VLANs). This allows the FCoE switch to effectively select different ethernet communication paths by selecting different VLANs, which is something the FCoE switch is configured to do without modification of the existing FC or ethernet protocols, virtual link aggregation groups, or "pause" commands to schedule the transmission of FC data through the ethernet side of the network. In a first illustrative embodiment, the FCoE switch utilizes a spanning tree protocol (STP) to select an active VLAN corresponding to a selected communication path while disabling all other VLANs corresponding to other communication paths. In a second illustrative embodiment, the FCoE switch utilizes a VLAN priority table to select an available VLAN that corresponds to a selected communication path.

FCoE integrates the FC standard conventionally utilized for SANs with the ethernet standard conventionally utilized for LANs. Basically, the FCoE switch physically connects to FC cables on one side, ethernet cables on the other side, and integrates FC communications with the ethernet protocol by encapsulating standard FC frames within standard ethernet frames. While this type of data encapsulation integrates standard FC data frames into the standard ethernet data stream, it presents a challenge because the FC protocol presumes point-to-point connectivity while the ethernet protocol presumes packet switched connectivity which, by definition, does not rely on point-to-point connectivity. As a result, the FC protocol presumes that FC data frames will be received in the same order sent and does not provide any mechanism for reordering the packets on the receipt side of the communication to accommodate varying amounts of transmission delay through the network. The ethernet protocol, on the other hand, allows different packets to take different paths through the network and thus is inherently designed to cause different packets to incur different amounts of transmission delay while propagating through the ethernet.

This difference between point-to-point connectivity presumed in the FC standard for SAN communications and packet switched connectivity presumed in the ethernet standard for LAN communications can therefore result in FC data streams becoming scrambled when FC frames that embedded within ethernet data streams. A variety of approaches might be utilized to prevent or correct this type of scrambling of the FC data. One approach uses the "pause" function available in the ethernet protocol to effectively schedule the transmission of the FC data packets through the ethernet. This approach can become unwieldy in large networks, slows data flow rates, and systematically interferes with the underlying ethernet operation through continual use of the "pause" function. Another approach utilizes link aggregation groups (LAGs) to effectively cause the ethernet packets containing FC data to propagate through the LAN along point-to-point paths defined by the LAGS. While LAGs are effective, they require software that may be referred to as virtual link aggregation group (VLAG) drivers to be installed and operated on all of the converged network adapters (CNAs) on the network. This requires additional software and configuration steps to bring new devices into the network.

The embodiments described in the present disclosure provide an improved mechanism to effectively cause the ethernet packets containing FC data to propagate along different point-to-point paths through the LAN without requiring additional software, such as VLAG drivers, to be installed and operated on all of the CNAs in the network. Instead, different paths through ethernet portion of the network connected to the FCoE switch are assigned to different VLANs. In addition, various CNAs are configured with multiple links, which may be physical cable connections or logical connections assigned to the different VLANs. This allows the FCoE switch to effectively select among different available paths through the ethernet side of the converged network by selecting among VLANs. Importantly, this is something currently available FCoE switches are configured to do without modification of the existing FC or ethernet protocols, and without the use of virtual link aggregation groups or "pause" commands to schedule the transmission of FC data through the ethernet side of the network.

Under this new approach, whenever a existing link is lost, the affected SAN device transmits a fiber channel forwarder (FCF) advertisement to the FCoE switch, which prompts the FCoE switch to connect the affected SAN device to a new VLAN. In a first embodiment, the FCoE utilizes a spanning tree protocol (STP) to select an alternate VLAN while disabling all other VLAN connections to the affected SAN device. In a second embodiment, the FCoE utilizes a VLAN priority table to select an alternate VLAN while disabling all other VLAN connections to the affected SAN device.

Turning now to FIG. 1, a portion of a converged FCoE network 10 is depicted. It will be understood that an actual FCoE network may be much more extensive and sophisticated, and that only a minimal number of representative elements sufficient to illustrate the functionality of the embodiments have been included in the figure. An illustrative server 12 includes an FCoE switch 14, which connects to a fiber channel side 18 and an ethernet side 20. The FCoE switch encapsulates FC frames into ethernet data streams, and vice versa, as specified in FCoE standards to enable the LAN devices on the ethernet side 20 to engage in I/O with the SAN devices on the fiber channel side 18. Although communications from an origination SAN device 40 to a destination LAN device 42 may be expressly described, it will be understood that bilateral communications are enabled by the protocols described.

Generally described, the fiber channel side 18 includes a number of physical storage area networks represented by SAN-A 22 and SAN-B 24. Each SAN includes a number of storage devices, such as disk and solid state storage drives, represented by drives A-1, A-2 through A-N of the SAN-A 22 and the drives B-1, B-2 through B-N of the SAN-B 32. The physical devices of the SANs are connected to each other and to the FCoE switch 14 via a number of physical cables. The physical devices of the SANs may be logically organized into any number of virtual storage area networks (VSANs) represented by VSAN-A 26 and VSAN-B 28.

Similarly, the ethernet side 18 includes a number of local area networks represented by LAN-A 32 and LAN-B 34. Each LAN includes a number of network devices, such as servers and workstations, represented by workstations A-1, A-2 through A-N of the LAN-A 32 and the workstations B-1, B-2 through B-N of the LAN-B 32. Each network device is connected to its corresponding LAN by a converged network adapter (CNA). The physical devices of the LANs are connected to each other and to the FCoE switch 14 via a number of physical cables. As on the FC side 18, the physical devices on the ethernet side 20 may also be logically organized into any number of virtual local area networks (VLANs) represented by VLAN-A 36 and VLAN-B 38.

Since the FC protocol presumes point-to-point connectivity within a SAN network, fiber channel data can become scrambled when FC data frames embedded within ethernet data streams propagate over different communication paths on the ethernet side 20 of the converged network 10. One conventional approach to solving this problem utilizes VLAG drivers running on all of the CNAs on the LAN devices, which are represented by the VLAG driver 44 shown in dashed lines in FIG. 1. A cooperating VLAG driver 46 also runs on all of the FCoE switches as represented by the VLAG driver 46, which is also shown in dashed lines FIG. 1. The VLAG drivers effectively group the physical links on the ethernet side 20 into a number of alternative point-to-point paths (aggregation groups) and select an active path for transmission of FC data through the ethernet side 20 of the converged network 10.

While the LAG approach is effective in preventing FC data scrambling, it requires installation and operation of VLAG drivers throughout the ethernet side 20 of the converged network 10. The embodiments described in the present disclosure provide alternate approaches to implementing multipath redundancy for FCoE networks that eliminated the need for the VLAG drivers represented by the VLAG drivers 44 and 46 shown in FIG. 1. While the technique is illustrated with respect to workstation WS A-1 in FIG. 1, it will be understood that the same technique may be used for any number of LAN devices.

In this particular example using the workstation WS A-1 as a representative destination LAN device 42, a first VLAN-A definess a first communication path from the workstation WS A-1 to the FCoE switch 14, while a second VLAN-B defines a second communication path from the workstation WS A-1 to the FCoE switch 14. The physical point-to-point communication paths defined by VLAN-A and VLAN-B may correspond to any desired physical paths through the LANs 32, 34. For example, VLAN-A in this example corresponds to a first particular point-to-point physical connection path from through LAN-A 32 from the destination LAN device 42 and the FCoE switch 14, while VLAN-B corresponds to a second physical connection path that travels through both LAN-A 32 and LAN-B 34 from the destination LAN device 42 and the FCoE switch 14. The CNA connecting the workstation WS A-1 to the network is configured with two VLAN links, VLAN-A link 50 and VLAN-B link 52, which in general may be physical cable connections or logical connections. This allows the FCoE switch 14 to effectively select different communication paths when selecting VLAN-A (which includes the VLAN-A link 50 to the workstation WS A-1) or VLAN-B (which includes the VLAN-B link 52 to the workstation WS A-1).

Figure 2:
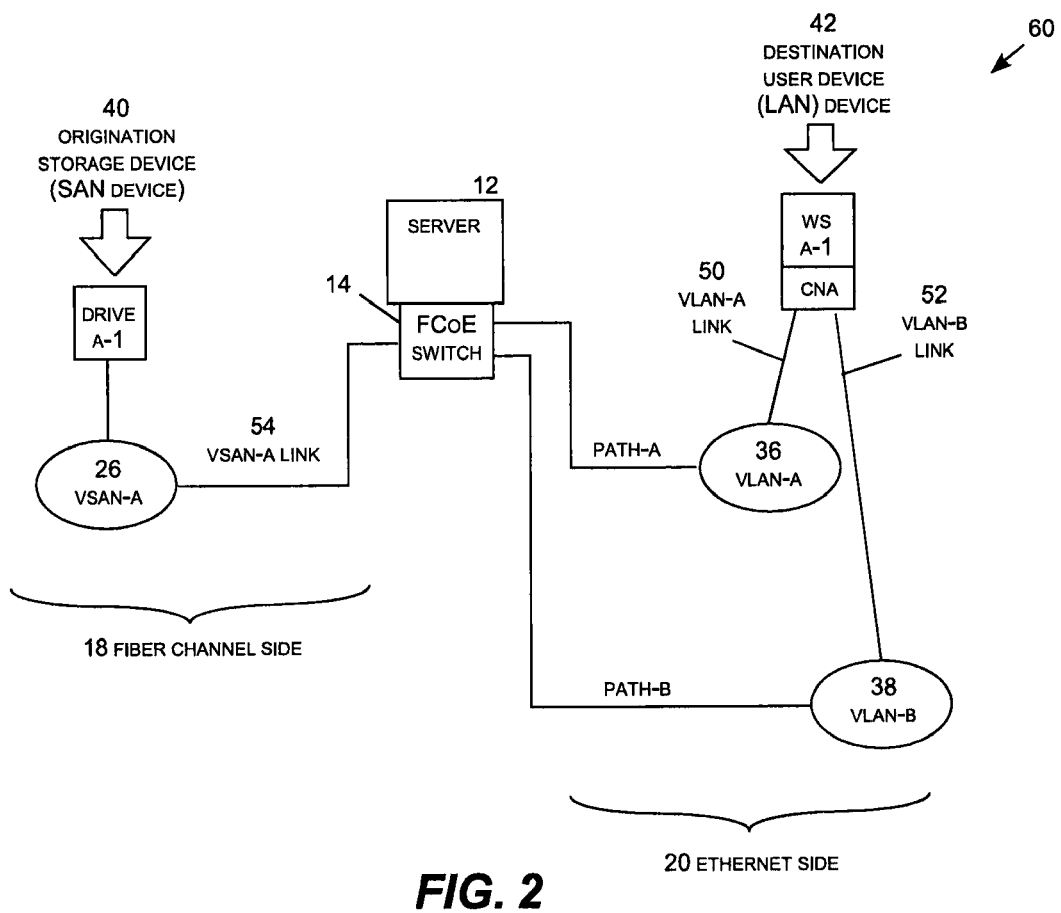
FIG. 2 depicts multipath selection of communication paths on the ethernet side of the network by the FCoE switch in accordance with an embodiment.

FIG. 2 depicts the isolated multipath connections from a representative origination storage device 40 on the fiber channel side 18 of the network, through the FCoE switch 14 running on the server 12, to a representative destination LAN device 42 on the ethernet side of the network 20 (the workstation WS A-1). As the FCoE switch 14 has the ability to select VLANS without involvement of cooperating software residing on the destination device LAN 42, selecting VLAN-A at the FCoE switch results in selecting the physical point-to-point path-A assigned to VLAN-A through the ethernet side 20 of the destination device 42. Similarly, selecting VLAN-B at the FCoE switch 14 results in selecting the physical point-to-point path-B assigned to VLAN-B through the ethernet side 20 of the network to the destination device 42.

Figure 3A:
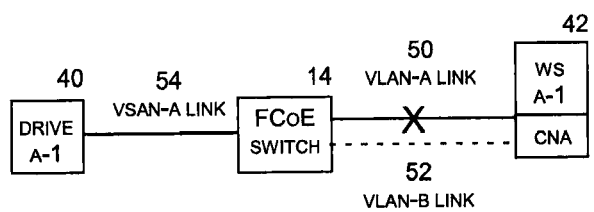
FIGS. 3A-3D depicts the use of a fiber channel forwarder advertisement and a spanning tree protocol to implement multipath selection by the FCoE switch in accordance with a first illustrative embodiment.

To provide multipath redundancy on the ethernet side 20 of the network while preventing FC frames from taking different paths through the network, the FCoE switch 14 activates only one VLAN at any time, which corresponds to activating only one physical point-to-point communication path through the ethernet portion of the network at any time. In a first embodiment illustrated by the series of figures FIG. 3A-3D, the FCoE switch utilizes a spanning tree protocol (STP) to activate a first selected VLAN on the ethernet side 20 of the network while disabling all other communication paths between the FCoE switch and the destination LAN device 42. In FIG. 3A the FCoE switch 14 has activated VSAN-A link 54 on to the fiber channel side 18 of the network to the origination SAN device 40. The FCoE switch has also enabled VLAN-A on the ethernet side 20 of the network including the VLAN-A link 50 to the destination LAN device 42 while disabling the VLAN-B link 52 to the destination LAN device. The FCoE switch 14 has activated has also enabled the link causing it to encapsulate FC frames received on the VSLAN Link 54 into ethernet framed transmitted on the VLAN-A link 50 and vice versa.

Figure 3B:
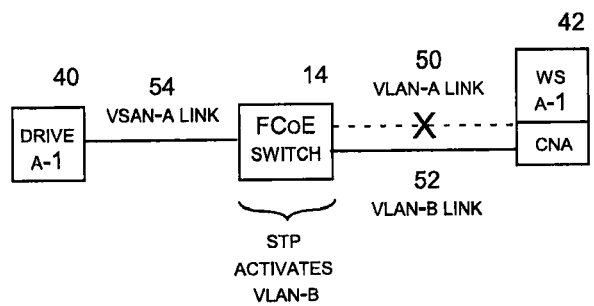
Figure 3C:
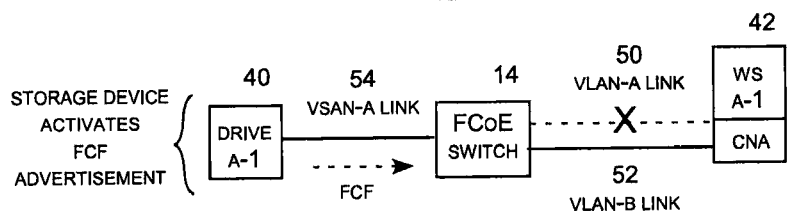
Figure 3D:
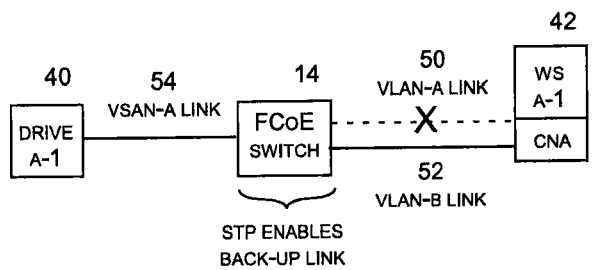

FIG. 3B illustrates a failure of a link in the VLAN-A, in this example represented by a failure of the VLAN-A link 52. The STP protocol causes the FCoE switch 14 to detect this failure and activate VLAN-B, in this example represented b the VLAN-B link 52. As shown in FIG. 3C, the origination SAN device 40 also detects the link failure, which causes the origination SAN device to broadcast a fiber channel forwarder (FCF) advertisement indicating that the origination SAN device has lost its connection and is therefore requesting access to the network. The FCF advertisement is received by the FCoE switch 14 which, as shown in FIG. 3D, responds to the FCF advertisement by enabling VLAN-B link 52 as the back-up link and resuming communications over the back-up link by encapsulating FC frames received on the VSLAN Link 54 into ethernet frames transmitted on the alternate VLAN-B link 50 and vice versa.

In other words, in response to an ethernet link failure between the FCoE switch and the destination LAN device, the FCoE switch (a) replaces the failed ethernet link by utilizing STP to activate an alternate VLAN corresponding to a new path through the ethernet side of the network from the FCoE switch the destination LAN device while disabling all VLANS corresponding to all other paths through the ethernet side of the network between the FCoE switch and the destination LAN device; (b) receives a FCF advertisement from the affected origination SAN device on the fiber channel side of the network; (c) enables communications between the VSAN link to the origination SAN device with the alternate VLAN through the switch; and (d) continues communications between the origination SAN device and the destination LAN device by encapsulating FC frames received on the VSLAN link into ethernet frames transmitted on the alternate VLAN link and vice versa.

Figure 4:
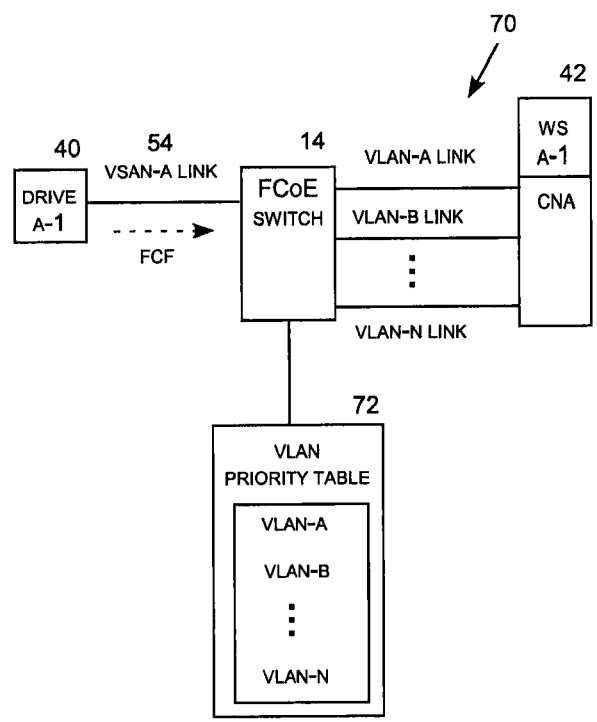
FIG. 4 depicts use of a fiber channel forwarder advertisement and a virtual LAN priority table to implement multipath selection by the FCoE switch in accordance with a second illustrative embodiment.

FIG. 4 depicts an alternate embodiment in which the FCoE switch 14 utilizes a VLAN priority table 72 rather than STP to select alternate VLANs in response to detecting link failures. The VLAN priority table 72 includes a list of available VLANS in a priority order for connecting the FCoE switch to the origination LAN device. The VLAN table 72 depicted in FIG. 4 serves as a representative example of similar VLAN priority tables that each FCoE switch typically stores for each LAN device connected to that FCoE switch. The VLAN priority table 72 provides a similar function to STP in the previously described embodiment except that the alternate VLANS are selected in a predefined priority order reflected in the table rather than being determined "on the fly" by the STP functionality residing on the FCoE switch.

Operation of the alternate embodiment shown in FIG, 4 can therefore be summarized as follows: in response to an ethernet link failure between the FCoE switch and the destination LAN device, the FCoE switch (a) replaces the failed ethernet link by utilizing a VLAN priority table to activate an alternate VLAN corresponding to a new path through the ethernet side of the network from the FCoE switch the destination LAN device while disabling all VLANS corresponding to all other paths through the ethernet side of the network between the FCoE switch and the destination LAN device; (b) receives a FCF advertisement from the affected origination SAN device on the fiber channel side of the network; (c) enables communications between the VSAN link to the origination SAN device with the alternate VLAN through the switch; and (d) continues communications between the origination SAN device and the destination LAN device by encapsulating FC frames received on the VSLAN link into ethernet frames transmitted on the alternate VLAN link and vice versa.

Figure 5:
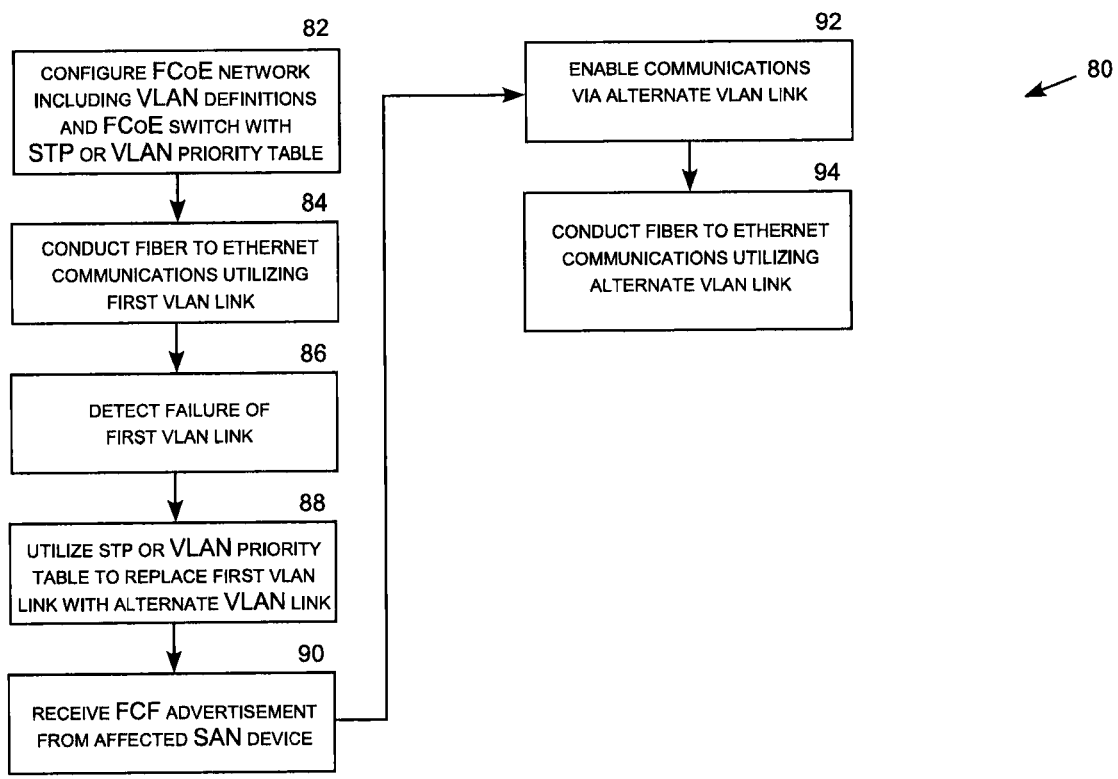
FIG. 5 is a logic flow diagram depicting operation of an FCoE network implementing multipath selection of ethernet links

FIG. 5 is a logic flow diagram depicting a routine 80 for operating an FCoE network implementing multipath selection of ethernet links. Block 82 includes configuring the FCoE network including an FCoE switch that interconnects a fiber channel side with an ethernet side to create a converged network communication path. The converged network path include a VSAN link between an origination SAN device on the fiber channel side and the FCoE switch, a first VLAN link between a destination LAN device on the ethernet side and the FCoE switch, and an alternate VLAN link between the destination LAN device and the FCoE switch.

Block 82 is followed by block 84, in which the FCoE switch conducts communications between the origination SAN device and the destination LAN device by encapsulating fiber channel data frames received on the VSAN link into ethernet frames transmitted on the first VLAN link and vice versa. Block 84 is followed by block 86, in which the FCoE switch detects a failure of the first VLAN link between the FCoE switch and the destination LAN device. Block 86 is followed by block 88, in which the FCoE switch replaces the failed first VLAN link by activating the alternate VLAN link corresponding to a new path through the ethernet side of the network between the FCoE switch the destination LAN device while disabling all other VLANS corresponding to other paths through the ethernet side of the network between the FCoE switch and the destination LAN device. For example, in one embodiment the FCoE switch may utilize STP to activate the alternate VLAN while disabling all other communication paths between the FCoE switch and the destination LAN device. In another embodiment the FCoE switch may utilize a VLAN priority table to activate the alternate VLAN while disabling all other communication paths between the FCoE switch and the destination LAN device.

Block 88 is followed by block 90, in which the FCoE switch receives an advertisement from the origination SAN device on the fiber channel side of the network indicating a request for network access by the origination SAN device. Block 90 is followed by block 92, in which the FCoE switch enables communications between the origination SAN device and the destination LAN device via the alternate VLAN link. And block 92 is followed by block 94, in which the FCoE switch resumes communications between the origination SAN device and the destination LAN device by encapsulating FC frames received on the VSLAN link into ethernet frames transmitted on the alternate VLAN link and vice versa.

In the embodiments, each SAN device may be a typical storage drive router and each LAN device may be a typical workstation or other network device. Each LAN device therefore has a processor, memory, network interface and other customary components. Similarly, each server with an FCoE network interface may be a conventional server, workstation or other network computing device with a processor, memory, network interface and other customary components as known in the technology. No special software or hardware functionality other than as describe above is required to operate the embodiments as described.

As will be appreciated by one of average skill in the art, aspects of embodiments may be embodied as a system, method or computer program product. Accordingly, aspects of embodiments may take the form of an entirely hardware embodiment, an entirely software embodiment (including firmware, resident software, micro-code, etc.) or an embodiment combining software and hardware aspects that may all generally be referred to herein as, for example, a "circuit," "module" or "system." Furthermore, aspects of embodiments may take the form of a computer program product embodied in one or more computer readable storage device(s) having computer readable program code embodied thereon.

One or more of the capabilities of embodiments can be implemented in software, firmware, hardware, or some combination thereof. Further, one or more of the capabilities can be emulated.

An embodiment may be a computer program product for enabling processor circuits to perform elements of the invention, the computer program product comprising a computer readable storage medium readable by a processing circuit and storing instructions for execution by the processing circuit for performing a method.

The computer readable storage medium (or media), being a tangible, non-transitory, storage medium having instructions recorded thereon for causing a processor circuit to perform a method. The "computer readable storage medium" being non-transitory at least because once the instructions are recorded on the medium, the recorded instructions can be subsequently read one or more times by the processor circuit at times that are independent of the time of recording. The "computer readable storage media" being non-transitory including devices that retain recorded information only while powered (volatile devices) and devices that retain recorded information independently of being powered (non-volatile devices). An example, non-exhaustive list of "non-transitory storage media" includes, but is not limited to, for example: a semi-conductor storage device comprising, for example, a memory array such as a RAM or a memory circuit such as latch having instructions recorded thereon; a mechanically encoded device such as punch-cards or raised structures in a groove having instructions recorded thereon; an optically readable device such as a CD or DVD having instructions recorded thereon; and a magnetic encoded device such as a magnetic tape or a magnetic disk having instructions recorded thereon.

A non-exhaustive list of examples of computer readable storage medium include the following: a portable computer diskette, a hard disk, a random access memory (RAM), a read-only memory (ROM), an erasable programmable read-only memory (EPROM or Flash memory), a portable compact disc read-only memory (CD-ROM). Program code can be distributed to respective computing/processing devices from an external computer or external storage device via a network, for example, the Internet, a local area network, wide area network and/or wireless network. The network may comprise copper transmission cables, optical transmission fibers, wireless transmission, routers, firewalls, switches, gateway computers and/or edge servers. A network adapter card or network interface card in each computing/processing device receives a program from the network and forwards the program for storage in a computer-readable storage device within the respective computing/processing device.

Computer program instructions for carrying out operations for aspects of embodiments may be for example assembler code, machine code, microcode or either source or object code written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of embodiments are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer readable storage medium that can direct a computer, other programmable data processing apparatus, or other devices to function in a particular.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A computer implemented method for providing multi-path connectivity between layers in a communication protocol, the method comprising:
    configuring a fiber channel over ethernet (FCoE) network including an FCoE switch interconnecting a fiber channel side with an ethernet side to create a converged network communication path that includes a virtual storage area network (VSAN) link between an origination storage area network (SAN) device on the fiber channel side and the FCoE switch, and a first virtual local area network (VLAN) link between a destination local area network (LAN) device on the ethernet side and the FCoE switch, and an alternate VLAN link between the destination LAN device and the FCoE switch;
    conducting communications between the origination SAN device and the destination LAN device by encapsulating fiber channel data frames received on the VSAN link into ethernet frames transmitted on the first VLAN link;
    detecting a failure of the first VLAN link between the FCoE switch and the destination LAN device;
    replacing the failed first VLAN link, the replacing comprising activating the alternate VLAN link corresponding to a new path through the ethernet side of the network between the FCoE switch and the destination LAN device while disabling all other VLANS corresponding to other paths through the ethernet side of the network between the FCoE switch and the destination LAN device;
    receiving an advertisement from the origination SAN device on the fiber channel side of the network indicating a request for network access by the origination SAN device;
    enabling communications between the origination SAN device and the destination LAN device via the alternate VLAN link; and
    resuming communications between the origination SAN device and the destination LAN device by encapsulating fiber channel frames received on the VSAN link into ethernet frames transmitted on the alternate VLAN link and vice versa.

2. The method of claim 1, wherein replacing the failed VLAN link further comprises utilizing a spanning tree protocol to select the alternate VLAN.

3. The method of claim 1, wherein replacing the failed VLAN link further comprises utilizing a VLAN priority table that stores identification information for a number of VLANS in a priority order to select the alternate VLAN.

4. The method of claim 1, wherein the first VLAN link comprises a first physical network cable connected between the destination LAN device and the FCoE network, and the alternate VLAN link comprises a second physical network cable connected between the destination LAN device and the FCoE network.

5. The method of claim 1, wherein the first VLAN link comprises a first logical connection between the destination LAN device and the FCoE network, and the alternate VLAN link comprises a second logical connection between the destination LAN device and the FCoE network.

6. The method of claim 1, further comprising configuring the FCoE network without link aggregation groups.

7. The method of claim 1, further comprising operating the FCoE network without utilizing pause commands to schedule transmission of fiber channel data frames through the ethernet side of the network.

8. A computer program product for implementing multi-path connectivity between layers in a communication protocol, the computer program product comprising:
    a non-transitory storage medium readable by a processing circuit and storing instructions for execution by the processing circuit for performing a method comprising:
    configuring a fiber channel over ethernet (FCoE) network including an FCoE switch interconnecting a fiber channel side with an ethernet side creating a converged network communication path including a virtual storage area network (VSAN) link between an origination storage area network (SAN) device on the fiber channel side and the FCoE switch, and a first virtual local area network (VLAN) link between a destination local area network (LAN) device on the ethernet side and the FCoE switch, and an alternate VLAN link between the destination LAN device and the FCoE switch;

conducting communications between the origination SAN device and the destination LAN device by encapsulating fiber channel data frames received on the VSAN link into ethernet frames transmitted on the first VLAN link and vice versa;

detecting a failure of the first VLAN link between the FCoE switch and the destination LAN device;

replacing the failed first VLAN link by activating the alternate VLAN link corresponding to a new path through the ethernet side of the network between the FCoE switch the destination LAN device while disabling all other VLANS corresponding to other paths through the ethernet side of the network between the FCoE switch and the destination LAN device;

receiving an advertisement from the origination SAN device on the fiber channel side of the network indicating a request for network access by the origination SAN device;

enabling communications between the origination SAN device and the destination LAN device via the alternate VLAN link; and resuming communications between the origination SAN device and the destination LAN device by encapsulating FC frames received on the VSAN link into ethernet frames transmitted on the alternate VLAN link and vice versa.

9. The computer program product of claim 8, wherein replacing the failed VLAN link further comprises utilizing a spanning tree protocol to select the alternate VLAN.

10. The computer program product of claim 8, wherein replacing the failed VLAN link further comprises utilizing a VLAN priority table storing identification information for a number of VLANS in a priority order to select the alternate VLAN.

11. The computer program product of claim 8, wherein the first VLAN link comprises a first physical network cable connected between the destination LAN device and the FCoE network, and the alternate VLAN link comprises a second network cable connected between the destination LAN device and the FCoE network.

12. The computer program product of claim 8, wherein the first VLAN link comprises a first logical connection between the destination LAN device and the FCoE network, and the alternate VLAN link comprises a second logical connection between the destination LAN device and the FCoE network.

13. The computer program product of claim 8, further comprising configuring the FCoE network without link aggregation groups.

14. The computer program product of claim 8, further comprising operating the FCoE network without utilizing pause commands to schedule transmission of fiber channel data frames through the ethernet side of the network.

* * * * *